Dec. 29, 1953

R. M. SMITH ET AL
INTERPOLE SHUNTING MEANS FOR ALTERNATING
CURRENT COMMUTATING MOTORS
Filed May 15, 1952

2,664,535

Inventors,
Russell M. Smith,
Max W. Bellis,
by Prowell & Mack
Their Attorney.

Patented Dec. 29, 1953

2,664,535

UNITED STATES PATENT OFFICE 2,664,535

INTERPOLE SHUNTING MEANS FOR ALTERNATING CURRENT COMMUTATING MOTORS

Russell M. Smith, Ripley, N. Y., and Max W. Bellis, Erie, Pa., assignors to General Electric Company, a corporation of New York Application May 15, 1952, Serial No. 287,942

8 Claims. (Cl. 318—244)

1

This invention relates to motor control systems and more particularly to a control system for a series alternating current motor having means for shunting the interpole to improve commutation.

In the design of systems utilizing series alternating current motors, for example, series traction motors in straight-electric locomotives operating from an alternating current trolley, it is desirable to provide means for shunting the motor interpoles with suitable reactances and other impedances in order to improve commutation when the motor is operating at heavy loads. It is further desirable that the means for interpole shunting have controllable and understandable calibration and that the shunting means operate at some definite point in the characteristic curve of the motor.

It is therefore an object of this invention to provide an improved control system for an alternating current series motor with means for shunting the interpoles to improve commutation incorporating the desirable features enumerated above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, means are provided to derive voltage signals responsive to the characteristic curve of the motor, i. e. the armature voltage and field current, and to convert these signals to direct current. The rectified signals are then impressed upon a differential-type relay which will pick up to shunt the interpole winding of the motor responsive to a predetermined differential between the two voltage signals. More specifically, a pair of rectifiers are provided having their inputs respectively connected for energization responsive to the voltage across the motor armature and the voltage across a series field winding. The outputs of these rectifiers are respectively connected to operating coils of a differential type relay with the relay contact being connected to place suitable reactance and resistance in parallel with the interpole winding.

Figure 1:
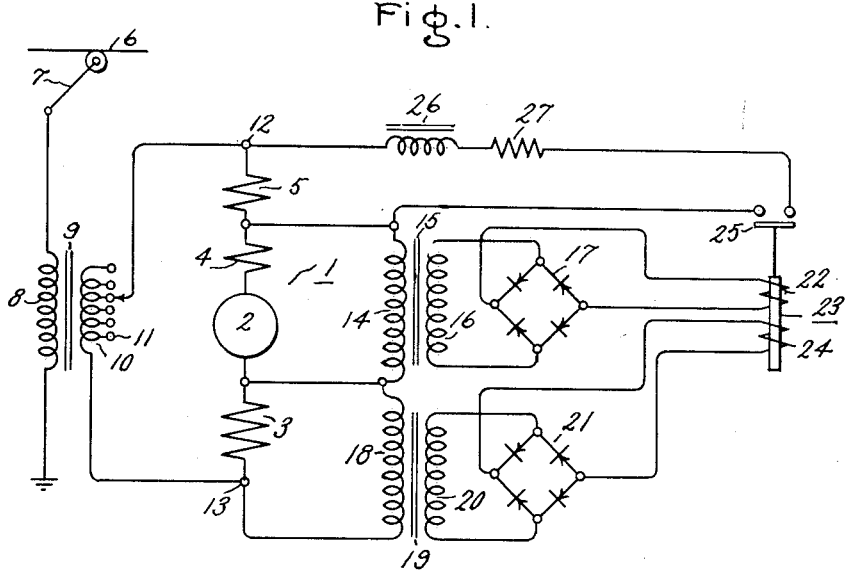
Figure 2:
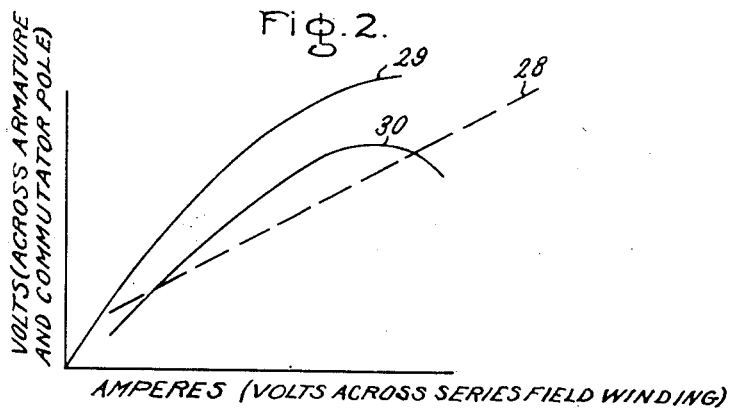

In the drawing, Fig. 1 is a schematic illustration showing the improved interpole shunting arrangement of this invention; and Fig. 2 shows the characteristic of the interpole relay compared with the motor characteristic.

2

Referring now to Fig. 1, there is shown a series commutator type alternating current motor 1 having an armature 2 with main field exciting winding 3, commutating pole winding 4, and interpole winding 5 connected in series therewith. The motor 1 is energized from a suitable source of alternating current, such as a trolley wire 6 with the pantograph or trolley 7 being connected to primary winding 8 of transformer 9. The primary winding 8 is also connected to ground to complete the circuit, for example, through a locomotive wheel to the rails. The secondary 10 of the transformer 9 is provided with a plurality of taps 11 connected to the terminals 12 and 13 of the motor 1 to provide a variable source of alternating current input to the motor.

In order to provide for shunting the interpole winding 5, primary winding 14 of transformer 15 is connected across commutating pole winding 4 and armature 2 of motor 1 and secondary winding 16 is connected to the input of bridge rectifier 17. Likewise, primary winding 18 of transformer 19 is connected across series field winding 3 and secondary winding 20 is connected to the input of bridge rectifier 21. The output of rectifier 17 is connected to operating coil 22 of differential-type relay 23 and the output of rectifier 21 is connected to operating coil 24 of relay 23; the operating coils 22 and 24 of relay 23 being arranged in opposition. Contact 25 of differential type relay 23 is arranged to connect suitable reactance 26 and resistance 27 in parallel across interpole winding 5.

It is readily apparent that relay 23 will pick up responsive to a predetermined net flux in its core and thus a large number of combinations of voltages impressed upon the operating coils 22 and 24 will cause the relay to pick up. This is more clearly shown in Fig. 2 where dashed line 28 represents the pick-up characteristic of relay 23, i. e. the relay will pick up with any combination of voltages appearing across operating coils 22 and 24 falling along and above the line 28. Referring again to Fig. 2, curve 29 shows the conventional series motor characteristic plotting terminal voltage against armature current while curve 30 shows the voltage appearing across the armature 2 and commutating pole 4 plotted against armature current. It will be noted that the armature and commutating pole voltage falls off in the high current region by reason of the back E. M. F. in the armature. It is thus seen that the relay 23 will pick up wherever the combination of armature volts and current, as represented by the armature characteristic curve 30, rises above the relay characteristic 28 and thus contact 25 will close to shunt interpole winding 5 in the high current region of the motor characteristic curve.

It is thus readily seen that this arrangement measures the voltage and current components of the armature characteristic curve and provides for shunting of the interpole winding responsive to a predetermined relationship of these components, specifically a predetermined differential between the armature voltage and armature current. It will be further readily apparent that one or more additional differential type relays may be provided with their operating coils respectively connected in parallel with operating coils 22 and 24 of relay 23, these additional relays being arranged with different pickup characteristics in order to shunt interpole winding 5 with various combinations of reactances and resistances responsive to further changes in the voltage relationship.

It will now be readily seen that this invention provides an improved alternating current series motor interpole shunting arrangement characterized by its simplicity and controllable and understandable calibration.

While we have shown and described a particular embodiment of this invention, further modifications and improvements will occur to those skilled in the art. We desire it to be understood therefore that this invention is not limited to the form shown and we intend in the appended claims to cover all modifications which do not depart from the spirit and scope of this invention.

What we claim as new and desire to secure by Letters Patent in the United States is:

1. In combination, a commutator-type dynamo-electric machine having an interpole winding connected in series with the armature of said machine, means connected to derive a first voltage proportional to the voltage across said armature, means connected to derive a second voltage proportional to the current flow in said armature, and means operable in response to a predetermined relationship of said first and second voltages connected to shunt said interpole winding thereby to improve the commutation of said machine.

2. In combination, a commutator type dynamo-electric machine having a field exciting winding and an interpole winding connected in series with the armature of said machine, means connected to derive a first voltage proportional to the voltage across said armature, means connected to derive a second voltage proportional to the voltage across said field winding, means connected to compare said first and second voltages, and means operable by said comparing means in response to a predetermined differential between said first and second voltages connected to shunt said interpole winding thereby to improve the commutation of said machine.

3. In combination, a commutator type dynamo-electric machine having a field exciting winding and an interpole winding connected in series with the armature of said machine, and a differential-type relay having a first operating coil connected for energization responsive to the voltage across said armature and a second operating coil opposing said first operating coil and connected for energization responsive to voltage across said field winding, said relay having a contact arranged to shunt said interpole winding in response to a predetermined differential between said armature voltage and said field winding voltage thereby to improve the commutation of said machine.

4. In an electric-drive vehicle, a commutator-type traction motor having a field exciting winding and an interpole winding connected in series with the armature of said motor, a source of variable voltage alternating current connected to energize said motor, means arranged to derive a first rectified voltage proportional to the voltage across said armature, means arranged to derive a second rectified voltage proportional to the voltage across said field winding, and means operable in response to a predetermined relationship of said first and second voltages connected to shunt said interpole winding thereby to improve the commutation of said motor.

5. In combination, a commutator-type dynamo-electric machine having a field exciting winding and an interpole winding connected in series with the armature of said machine, a source of variable voltage alternating current connected to energize said machine, means arranged to derive a first rectified voltage proportional to the voltage across said armature, means arranged to derive a second rectified voltage proportional to the voltage across said field winding, means connected to compare said first and second voltages, and means operable by said comparing means in response to a predetermined differential between said first and second voltages connected to shunt said interpole winding thereby to improve the commutation of said machine.

6. In combination, a commutator-type dynamo-electric machine having a field exciting winding and an interpole winding connected in series with the armature of said machine, a source of variable voltage alternating current connected to energize said machine, a first rectifier having its input connected for energization responsive to the voltage across said armature, a second rectifier having its input connected for energization responsive to the voltage across said field winding, and a differential type relay having one operating coil connected for energization responsive to the output of said first rectifier and a second operating coil opposing said first operating coil connected for energization responsive to the output of said second rectifier, said relay having a contact connected to shunt said interpole winding in response to a predetermined differential between said armature voltage and said field voltage thereby to improve the commutation of said machine.

7. In combination, a commutator-type dynamo-electric machine having a field exciting winding and an interpole winding connected in series with the armature of said machine, a source of variable voltage alternating current connected to energize said machine, a pair of rectifiers, means connecting the input of one of said rectifiers for energization from said armature, means connecting the input of the other of said rectifiers for energization from said field winding, and a differential type relay having an operating coil connected for energization from the output of said one rectifier and another operating coil opposing said one operating coil connected for energization from the output of said other rectifier, said relay having a contact connected to shunt said interpole winding in response to a predetermined differential between said armature voltage and said field voltage to improve the commutation of said machine.

8. In an electric-drive vehicle, a commutator-type traction motor having a field exciting winding and an interpole winding connected in series with the armature of said motor, a source of variable voltage alternating current connected to energize said motor, a pair of full-wave rectifiers, a transformer having its primary connected across said armature and its secondary connected to the input of one of said rectifiers, another transformer having its primary connected across said field winding and its secondary connected to the input of the other of said rectifiers, and a differential type relay having one operating coil connected to the output of one of said rectifiers and another operating coil opposing said one operating coil connected to the output of said other rectifier, said relay having a contact connected to shunt said interpole winding in response to a predetermined differential between said armature voltage and said field voltage thereby to improve the commutation of said motor.

RUSSELL M. SMITH.
MAX W. BELLIS.

References Cited in the file of this patent

UNITED STATES PATENTS

| Number | Name | Date |
| --- | --- | --- |
| 2,012,824 | McNairy et al. | Aug. 27, 1935 |
| 2,053,440 | Powers | Sept. 8, 1936 |
| 2,202,708 | McNairy | May 28, 1940 |
| 2,241,961 | Pritchard | May 13, 1941 |